(12) United States Patent
Liu et al.

(10) Patent No.: US 10,760,001 B2
(45) Date of Patent: Sep. 1, 2020

(54) STRAIGHT FIN FOR DEVICE FOR RECOVERING WASTE HEAT OF RAW COKE OVEN GAS IN ASCENSION PIPE OF COKE OVEN, AND HEAT RECOVERING DEVICE

(71) Applicant: NANJING HUADIAN ENERGY-SAVING & ENVIRONMENTAL PROTECTION EQUIPMENT CO., LTD, Nanjing (CN)

(72) Inventors: Xiaoping Liu, Nanjing (CN); Jianning Lu, Nanjing (CN); Juxiang Li, Nanjing (CN); Renhe Dong, Nanjing (CN); Guilan Yang, Nanjing (CN); Xuan Zheng, Nanjing (CN)

(73) Assignee: NANJING HUADIAN ENERGY-SAVING & ENVIRONMENTAL PROTECTION EQUIPMENT CO., LTD, Nanjing (CN)

( * ) Notice: Subject to any disclaimer, the term of this patent is extended or adjusted under 35 U.S.C. 154(b) by 0 days.

(21) Appl. No.: 16/342,971

(22) PCT Filed: Sep. 19, 2017

(86) PCT No.: PCT/CN2017/102248
§ 371 (c)(1),
(2) Date: Apr. 18, 2019

(87) PCT Pub. No.: WO2018/076964
PCT Pub. Date: Mar. 5, 2018

(65) Prior Publication Data
US 2020/0048557 A1    Feb. 13, 2020

(30) Foreign Application Priority Data

Oct. 24, 2016  (CN) .......................... 2016 1 0929495
Sep. 13, 2017  (CN) .......................... 2017 1 0820063

(51) Int. Cl.
*C10B 3/02* (2006.01)
*F22B 1/18* (2006.01)
(Continued)

(52) U.S. Cl.
CPC .................. *C10B 3/02* (2013.01); *F22B 1/18* (2013.01); *F27D 17/004* (2013.01); *F28F 1/40* (2013.01);
(Continued)

(58) Field of Classification Search
CPC ....................................................... C10B 3/02
See application file for complete search history.

(56) References Cited

U.S. PATENT DOCUMENTS 2,029,437 A * 2/1936 Murray ................. F22B 37/102
165/171
2,578,305 A * 12/1951 Huet ......................... F28F 1/30
165/164
(Continued)

FOREIGN PATENT DOCUMENTS

| CN | 101603793 A | 12/2009 |
|---|---|---|
| CN | 104048544 A | 9/2014 |

(Continued)

OTHER PUBLICATIONS

DE3526477A1—machine translation (Year: 1987).*

*Primary Examiner* — Nathaniel Herzfeld
(74) *Attorney, Agent, or Firm* — Bayramoglu Law Offices LLC (57) ABSTRACT

A straight fin for a device for recovering the waste heat of raw coke oven gas in the ascension pipe of the coke oven
(Continued)

includes the straight fin body and a group of V-shaped notches disposed on the straight fin body. The depth h of the V-shaped notches is less than the width H of the straight fin body. The distances between the adjacent V-shaped notches increase from bottom to top in the longitudinal direction of the straight fin body. The present invention further provides a heat recovering device and a power generation device both including the straight fins. Moreover, the width, the angle, and the distances in the longitudinal direction of the V-shaped notches at the top of the straight fin are determined according to the temperature field distribution during use of the device.

12 Claims, 3 Drawing Sheets

(51) Int. Cl.
   *F27D 17/00* (2006.01)
   *F28F 1/40* (2006.01)
(52) U.S. Cl.
   CPC .... *F27D 2017/006* (2013.01); *F28F 2215/08* (2013.01)

(56) References Cited

U.S. PATENT DOCUMENTS

| | | | | |
|---|---|---|---|---|
| 3,279,535 | A * | 10/1966 | Huet | F28F 1/14 165/183 |
| 3,752,228 | A | 8/1973 | Bosse | |
| 4,199,008 | A * | 4/1980 | Bright | C10B 27/06 126/307 R |
| 4,298,333 | A * | 11/1981 | Wunning | F23C 3/002 431/11 |
| 4,304,413 | A * | 12/1981 | Champagne | F16L 37/00 202/242 |
| 2008/0006059 | A1 * | 1/2008 | Hanna | C03B 37/0209 65/481 |

FOREIGN PATENT DOCUMENTS

| | | | |
|---|---|---|---|
| CN | 106433695 A | 2/2017 | |
| CN | 206345819 U | 7/2017 | |
| DE | 3526477 A1 * | 2/1987 | ........... F28D 7/1669 |
| JP | 58076487 A * | 5/1983 | |

* cited by examiner

STRAIGHT FIN FOR DEVICE FOR RECOVERING WASTE HEAT OF RAW COKE OVEN GAS IN ASCENSION PIPE OF COKE OVEN, AND HEAT RECOVERING DEVICE

CROSS REFERENCE TO THE RELATED APPLICATIONS

This application is the national phase entry of International Application No. PCT/CN2017/102248, filed on Sep. 19, 2017, which is based upon and claims priority to Chinese Patent Application No. 201610929495.5, filed on Oct. 24, 2016, and Chinese Patent Application No. 201710820063.5, filed on Sep. 13, 2017, the entire contents of which are incorporated herein by reference.

TECHNICAL FIELD

The present invention relates to the field of boiler equipment technologies, in particular, to a straight fin for a device for recovering the waste heat of raw coke oven gas in an ascension pipe of a coke oven, further to a device for recovering the waste heat of raw coke oven gas in an ascension pipe of a coke oven including the straight fin, and further to a coke oven ascension pipe waste heat boiler power generation device including the straight fins.

BACKGROUND

A fin is a basic element of a plate-fin heat exchanger. A heat exchange process in the plate-fin heat exchanger is mainly accomplished through heat conduction of the fin and convection heat transfer between the fin and fluids. The fin is a secondary heat exchange surface, not only can expand a heat transfer area and improve compactness and heat transfer efficiency of the heat exchanger, but also can support a core body and improve strength and a pressure bearing capability of the heat exchanger.

As an efficient, compact, and lightweight heat exchange device, the plate-fin heat exchanger has been widely applied to the fields such as the petrochemical industry field, the aerospace field, the electronic field, the metallurgy field, and the machinery field, and achieves remarkable economic benefits in using heat energy, recovering waste heat, saving materials, reducing costs, and some special uses. The plate-fin heat exchanger is one of efficient and compact heat exchange devices, and has the fin between plates as a main heat transfer element. Commonly fin forms used mainly include: a plain fin, a serrated fin, a wavy fin, a louvered fin, a split fin, and the like. A surface characteristic of the fin decides characteristics of fluid flow and heat transfer in the entire heat exchanger. As the gradually expanding of the application range of the plate-fin heat exchanger, higher requirement should be imposed on the fin performance. It is increasingly urgent to need to develop new types of fins.

The coke oven can perform high-temperature carbonization treatment on coal, efficiently convert the coal into products such as coke, coke oven gas, coal tar, and crude benzene. The coke oven is an energy conversion furnace. Among the kinds of coke oven expending heat, the heat brought out by raw coke oven gas with the temperature of 650° C. to 700° C. accounts for approximately 36%, has extremely high recovery and utilization value.

In a device for recovering waste heat of raw coke oven gas in an ascension pipe of a coke oven, heat recovery efficiency can be greatly increased by using a wall type heat exchanger. However, the raw coke oven gas flows from bottom to top inside a drum, and the heat transfer medium also flows in the heat transfer tube which is disposed on the outside of the drum from bottom to top, it presents a parallel flow type between the raw coke oven gas and the heat transfer medium. For a drum wall inside which the raw coke oven gas flowing, because the lower part is affected by the convection heat transfer of the raw coke oven gas and the radiation heat transfer both of the raw coke oven gas and the furnace, the lower part temperature is obviously higher than that of the upper part. Therefore, similarly, a temperature of a lower part of a straight fin is obviously higher than that of an upper part. Moreover, at the same height position, a temperature at the top (far from drum wall) of the straight fin is higher than that of at the bottom (near to drum wall) of the straight fin. If a conventional straight fin of a rectangular thin plate structure was directly welded to the inner drum wall of the raw coke oven gas passage, for the top of each straight fin, the lower part should have a higher thermal expansion rate than that of the upper part, and at the same height position, the top of the fin should have a higher thermal expansion rate than that of the bottom part. Therefore, for an entire straight fin, the expansion might be relatively complex and different everywhere, and the expansion should be inconsistent with that of the drum wall. Eventually, a case in which welding seams between the straight fins and the drum wall should be disengaged due to tearing, resulting in the failure of the heat transfer area of the straight fins.

SUMMARY

Technical Problem

To overcome the defects of the prior art, the present invention provides a kind of straight fin for a device for recovering the waste heat of raw coke oven gas in the ascension pipe of a coke oven, and further provides an application of the straight fin.

Technical Solution

The straight fin for a device for recovering the waste heat of raw coke oven gas in an ascension pipe of a coke oven provided in the present invention includes a straight fin body (1) and a group of V-shaped notches (2) disposed on the straight fin body (1); the depth h of the V-shaped notches (2) is less than the width H of the straight fin body (1); and the distances between the adjacent V-shaped notches (2) increase from bottom to top in the longitudinal direction of the straight fin body (1). The width, the angle, and the distances in the longitudinal direction of the V-shaped notches (2) at the top of the straight fin are determined according to the temperature field distribution during use of a device. Therefore, when the device is used, an amount of longitudinal expansion at the top of the fin is less than or equal to the width of the notch, and the straight fin is made to still keep a flat rectangular shape after global expansion in the longitudinal direction, and does not depart from the inner drum wall.

As an improvement, the group of V-shaped notches (2) are sequentially numbered Q1 to Qn−1 from bottom to top in the longitudinal direction of the straight fin body (1); a distance from Q1 to the bottom of the straight fin body (1) is L1, the distances of the adjacent V-shaped notches (2) from bottom to top are L2 to Ln−1, and a distance from Qn−1 to the top is Ln; and values of L1 to Ln increase.

As a further improvement, L1 to Ln basically form an arithmetic sequence.

As another improvement, the group of V-shaped notches (2) have an equal opening angle θ, and the group of V-shaped notches (2) have an equal depth h.

The present invention further provides a device for recovering the waste heat of raw coke oven gas in the ascension pipe of the coke oven, including the straight fins as above.

As an improvement, the device for recovering the waste heat of raw coke oven gas in an ascension pipe of a coke oven includes a raw coke oven gas drum (11), a heat transfer tube (12), and a group of straight fins (13); the heat transfer tube (12) is disposed tightly on the outer surface of the wall of the raw coke oven gas drum (11); the group of straight fins (13) are disposed on the inner surface of the raw coke oven gas drum (11); the raw coke oven gas drum (11) has a raw coke oven gas inlet provided with a lower flange (14) and a raw coke oven gas outlet provided with an upper flange (15); there is an expansion joint (16) at the top of the raw coke oven gas drum (11)); and at lower part of the heat transfer tube (12) there is a heat medium inlet (17) and at the upper part there is a heat medium outlet (18).

As an improvement, the group of straight fins (13) is disposed at the same interval along the circumference of the inner wall of the raw coke oven gas drum (11); and the group of straight fins (13) are vertically disposed along the axial of the inner wall of the raw coke oven gas drum (11).

The present invention further provides a coke oven ascension pipe waste heat boiler power generation device, including the straight fins.

As an improvement, the coke oven ascension pipe waste heat boiler power generation device includes a waste heat boiler (22), a heat medium pump (23), a steam turbine (24), a water pump (25), a power generation device (26), and a group of devices (21) for recovering the waste heat of raw coke oven gas in the ascension pipe of the coke oven; the waste heat boiler (22) includes a heat transfer medium pipeline and a steam-water circulation pipeline; a heat medium outlet (18) of the device (21) for recovering the waste heat of raw coke oven gas in the ascension pipe of the coke oven is connected to the heat transfer medium pipeline and the heat medium pump (23) of the waste heat boiler (22) sequentially, the heat medium pump (23) is connected to a heat medium inlet (17) of each device (21) for recovering the waste heat of raw coke oven gas in the ascension pipe of the coke oven; the steam-water circulation pipeline, the steam turbine (24), and the water pump (25) of the waste heat boiler (22) are sequentially connected into a ring; and the power generation device (26) is connected to the steam turbine (24).

As another improvement, the coke oven ascension pipe waste heat boiler power generation device includes a group of distributed ascension pipe raw coke oven gas evaporator set (31), a distributed ascension pipe raw coke oven gas superheater set (32), a steam drum (34), a circulation pump (35), a steam turbine (36), a water-feeding pump (37), and a power generation device (38); the distributed ascension pipe raw coke oven gas evaporator set (31) and the distributed ascension pipe raw coke oven gas superheater set (32) separately include a group of devices (33) for recovering the waste heat of raw coke oven gas in the ascension pipe of the coke oven those are connected in parallel; the steam drum (34) is provided with a steam-water mixture inlet pipe, a saturated steam outlet pipe, a water inlet, and a water outlet; the distributed ascension pipe raw coke oven gas evaporator set (31) is connected to the steam-water mixture inlet of the steam drum (34); the saturated steam outlet pipe of the steam drum (34), the distributed ascension pipe raw coke oven gas superheater set (32), the steam turbine (36), the water-feeding pump (37), and the water inlet of the steam drum (34) are sequentially connected; the water outlet of the steam drum (34) is connected to the circulation pump (35), and the circulation pump (35) is connected to the distributed ascension pipe raw coke oven gas evaporator set (31); and the power generation device (38) is connected to the steam turbine (36).

Advantageous Effect

The straight fin provided in the present invention is simple in structure, low in cost, and convenient to use, and can greatly enhance the heat transfer performance of the raw coke oven gas side, and increase the wall temperature of the inner drum surface. Moreover, when the device is used, the width, the angle and the distances in the longitudinal direction of the V-shaped notches (2) at the top of the straight fin make an amount of longitudinal expansion at the top of the fin less than or equal to the width of the notch, and the straight fin is made to keep a flat rectangular shape after global expansion in the longitudinal direction, and does not depart from the inner drum wall, greatly prolonging the service life.

The straight fin provided in the present invention is not of the conventional rectangular thin plate structure, but of the special structure obtained after heat transfer calculation and material mechanics calculation:

(1) The straight fin is provided with a particular quantity of V-shaped notches, and the opening area of the V-shaped notch is at the top of the straight fin, to be specific, exposes in the raw coke oven gas passage. Because the temperature at the top (far from the drum wall) of the straight fin is higher than that of at the bottom (near to the drum wall) of the straight fin at the same height position, the expansion rate of the top opening is greater than that of the bottom, and the top opening gradually closes. Moreover, to maintain entirety, continuity, and flatness of the straight fin, the tip of the V-shaped notch departs from the bottom of the straight fin (that is, an edge of the straight fin welded to the inner wall of raw coke oven gas drum) by a particular distance. The V-shaped notches are with an equal angle θ and the tip departs from the bottom of the straight fin by an equal distance h. When the device is used, the width, the angle, the distances in the longitudinal direction of the V-shaped notch at the top of the straight fin make an amount of expansion at the top of the fin less than or equal to the width of the notch, and the straight fin is made to keep a flat rectangular shape after global expansion in the height direction, and does not depart from the inner drum wall.

(2) The temperature of the lower part is relatively higher and the upper part is relatively lower along the longitudinal direction of the straight fin. Therefore, positions of the V-shaped notches in the present invention are not uniformly, and instead, the lower part is relatively denser and the upper part is relatively sparser. The net distances between adjacent V-shaped notches are arranged according to a particular rule (such as a basic arithmetic progression).

DETAILED DESCRIPTION OF THE EMBODIMENTS

The following further describes the present invention.

Embodiment 1

Figure 1:
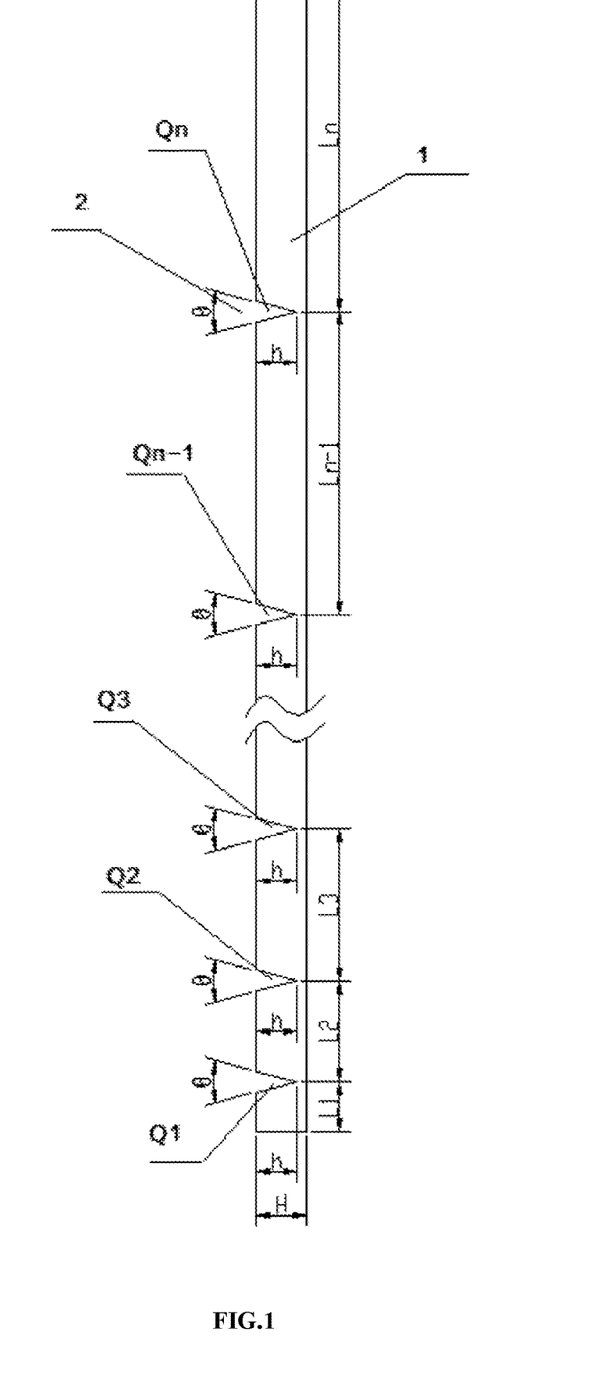
FIG. 1 is a schematic structural diagram of a straight fin according to the present invention.

A straight fin for a device for recovering waste heat of raw coke oven gas in an ascension pipe of a coke oven is provided, as shown in FIG. 1, and includes a straight fin body (1) and a group of V-shaped notches (2) disposed on the straight fin body (1); the depth h of the V-shaped notches (2) is less than the width H of the straight fin body (1); and the distances between the adjacent V-shaped notches (2) increase from bottom to top in the longitudinal direction of the straight fin body (1).

The group of V-shaped notches (2) are sequentially numbered Q1 to Qn−1 from bottom to top in the longitudinal direction of the straight fin body (1); a distance from Q1 to the bottom of the straight fin body (1) is L1, the distances of the adjacent V-shaped notches (2) from bottom to top are L2 to Ln−1, and a distance from Qn−1 to the top is Ln; and L1 to Ln form an arithmetic sequence, and optionally, that values of L1 to Ln increase can also achieve the objective of the present invention.

The group of V-shaped notches (2) have an equal opening angle θ, and the group of V-shaped notches (2) have an equal depth h.

A batch of straight fins are prepared, referring to Table 1.

TABLE 1

| Number | H/mm | h/mm | Opening width/mm | L1/mm | Tolerance of an arithmetic sequence/mm |
|---|---|---|---|---|---|
| Straight fin 1 | 60 | 40 | 3 | 600 | 100 |
| Straight fin 2 | 60 | 40 | 3 | 600 | 50 |
| Straight fin 3 | 60 | 40 | 3 | 600 | 150 |
| Straight fin 4 | 60 | 40 | 3 | 600 | 0 |
| Straight fin 5 | 60 | 40 | 2 | 600 | 100 |

TABLE 1-continued

| Number | H/mm | h/mm | Opening width/mm | L1/mm | Tolerance of an arithmetic sequence/mm |
|---|---|---|---|---|---|
| Straight fin 6 | 60 | 40 | 1 | 600 | 100 |
| Straight fin 7 | 60 | 30 | 3 | 600 | 100 |
| Straight fin 8 | 60 | 20 | 3 | 600 | 100 |
| Straight fin 9 | H is 60 mm; h is 40 mm, and an opening width is 3 mm; L1 is 600 mm; distances among L1, L3, L5, . . . are equal, and the distance is 100 mm; and distances among L2, L4, L6, . . . are equal, and the distance is 50 mm. | | | | |
| Straight fin 10 | H is 60 mm; h is 40 mm, and an opening width is 3 mm; L1 is 600 mm; distances among L1, L3, L5, . . . are equal, and the distance is 100 mm; and distances among L2, L4, L6, . . . are equal, and the distance is 150 mm. | | | | |

Embodiment 2

Figure 2:
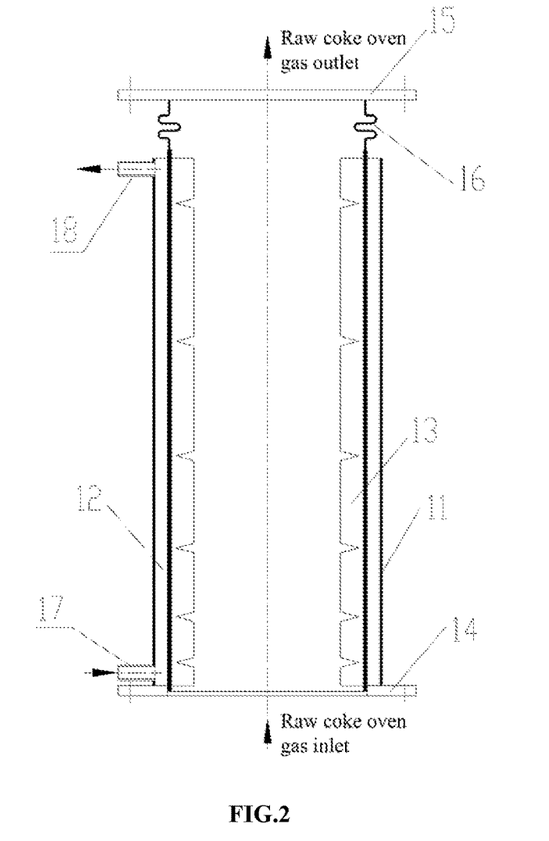
FIG. 2 is a schematic structural diagram of a device for recovering the waste heat of raw coke oven gas in an ascension pipe of a coke oven according to the present invention.

A device for recovering the waste heat of raw coke oven gas in an ascension pipe of a coke oven is provided, as shown in FIG. 2, and includes a raw coke oven gas drum (11), a heat transfer tube (12), and a group of straight fins (13) according to Embodiment 1. The heat transfer tube (12) is disposed tightly on the outer surface of the raw coke oven gas drum wall (11). The group of straight fins (13) are disposed on the inner surface of the raw coke oven gas drum wall (11). There is a raw coke oven gas inlet provided with a lower flange (14) and a raw coke oven gas outlet provided with an upper flange (15) for the raw coke oven gas drum (11). There is an expansion joint (16) at the top of the raw coke oven gas drum (11). At the lower part of the heat transfer tube (12) there is a heat transfer medium inlet (17), and at the upper part, there is a heat transfer medium outlet (18).

Figure 3:
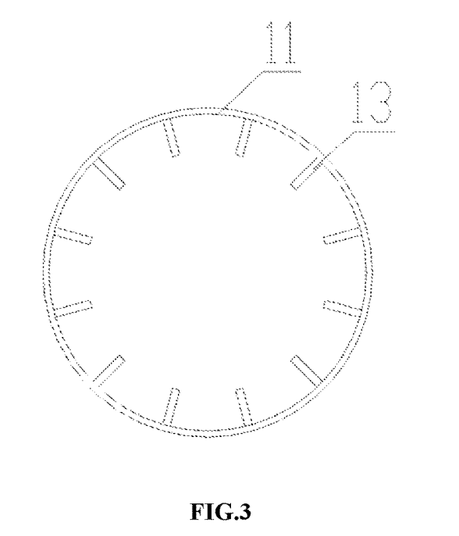
FIG. 3 is a schematic structural diagram of a method for disposing of the straight fins in circumference of the raw coke oven gas drum wall.

In the present invention, the group of straight fins (13) is vertically disposed at the same interval along the circumference of the inner wall of the raw coke oven gas drum (11), as shown in FIG. 3. Optionally, regardless of whether the group of straight fins (13) are vertically disposed along the circumference of the inner wall of raw coke oven gas drum (11), the objective of the present invention can be achieved.

The straight fins which are numbered from 1 to 10 in Embodiment 1 are separately mounted on the device for recovering the waste heat of raw coke oven gas in the ascension pipe of the coke oven. In each, the raw coke oven gas are with the approximately same inlet temperature T1 introduced to the raw coke oven gas drum (11), the outlet temperature T2 of the raw coke oven gas, the temperature T3 of the top of the straight fin in the width direction of different heights (H1), and the temperature T4 of the bottom of the straight fin in the width direction of different heights (H1), all the results above are shown in Table 2.

TABLE 2

| Number | H1/mm | T1/° C. | T2/° C. | T3/° C. | T4/° C. | Description (compared with 1) |
|---|---|---|---|---|---|---|
| Straight fin 1 | 800 | 805 | 650 | 520.5 | 466.1 | Effect is best |
| Straight fin 2 | 800 | 801 | 655 | 545.1 | 465.1 | There are more notches, an area is smaller, a heat transfer effect is poorer, and a temperature drop of gas is smaller |
| Straight fin 3 | 800 | 800 | 648 | 554.5 | 480.2 | There are less notches, and a temperature is higher and an expansion amount is larger at the top and the bottom of the fin |
| Straight fin 4 | 800 | 800 | 658 | 546.5 | 478.6 | There are slightly more notches, an area is even smaller than 2, a heat transfer effect is poorer, and a temperature drop of gas is even smaller |

TABLE 2-continued

| Number | H1/mm | T1/° C. | T2/° C. | T3/° C. | T4/° C. | Description (compared with 1) |
|---|---|---|---|---|---|---|
| Straight fin 5 | 800 | 800 | 648 | 558.5 | 474.6 | Notches are smaller, and an expansion amount is larger at the top of the fin, indicating that a temperature is higher |
| Straight fin 6 | 800 | 800 | 649 | 560.5 | 475.1 | Notches are smaller, and an expansion amount is larger at the top of the fin, indicating that a temperature is higher |
| Straight fin 7 | 800 | 800 | 648 | 565.8 | 476.4 | Height of notches are smaller, and a temperature is even higher at the top of the fin |
| Straight fin 8 | 800 | 801 | 650 | 570.7 | 481.5 | Height of notches are smaller, and a temperature is even higher at the top of the fin |
| Straight fin 9 | 800 | 800 | 655 | 549.5 | 469.8 | An area is smaller, and a temperature drop of raw coke oven gas is smaller |
| Straight fin 10 | 800 | 800 | 648 | 552.5 | 473.5 | Temperature at the top of the fin is even higher |

Embodiment 3

Figure 4:
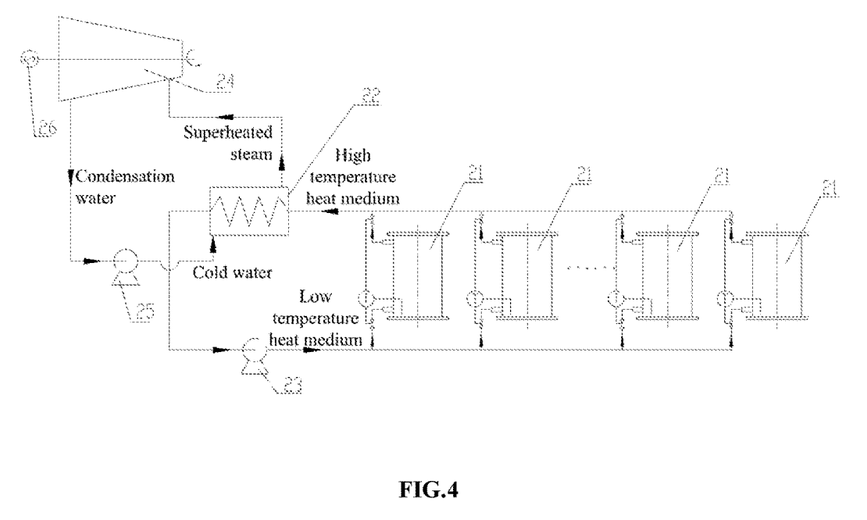
FIG. 4 is a schematic structural diagram of a coke oven ascension pipe waste heat boiler power generation device according to Embodiment 3.

A coke oven ascension pipe waste heat boiler power generation device is provided as shown in FIG. 4. It includes a waste heat boiler (22), a heat medium pump (23), a steam turbine (24), a water pump (25), a power generation device (26), and a group of devices (21) for recovering the waste heat of raw coke oven gas in the ascension pipe of a coke oven according to Embodiment 2. The waste heat boiler (22) includes a heat medium pipeline and a steam-water circulation pipeline. A heat medium outlet (18) of the device (21) for recovering the waste heat of raw coke oven gas in the ascension pipe of the coke oven is connected to the heat medium pipeline and the heat medium pump (23) of the waste heat boiler (22) sequentially. The heat medium pump (23) is connected to the heat medium inlet (17) of each device (21) for recovering the waste heat of raw coke oven gas in the ascension pipe of the coke oven. The steam-water circulation pipeline, the steam turbine (24), and the water pump (25) of the waste heat boiler (22) are sequentially connected as a ring. The power generation device (26) is connected to the steam turbine (24).

Using the coke products with 1300,000 tons per year coking as an example, the temperature of the raw coke oven gas inlet to the ascension pipe is about 800° C. Currently, it is reduced to 70° C. by spraying aqueous ammonia.

Renovation is performed thereto, and this coke oven ascension pipe waste heat boiler power generation device of a heat medium circulation type (including the straight fin 1) is used, so that the raw coke oven gas waste heat can be recovered, and the steam of 2.0 MPa pressure is superheated to be 250° C. The steam products is up to 123,000 tons per year. The steam is connected to the power generation system, and the annual power generation can reach 20 million kWh, bringing remarkable economic benefits.

Embodiment 4

Figure 5:
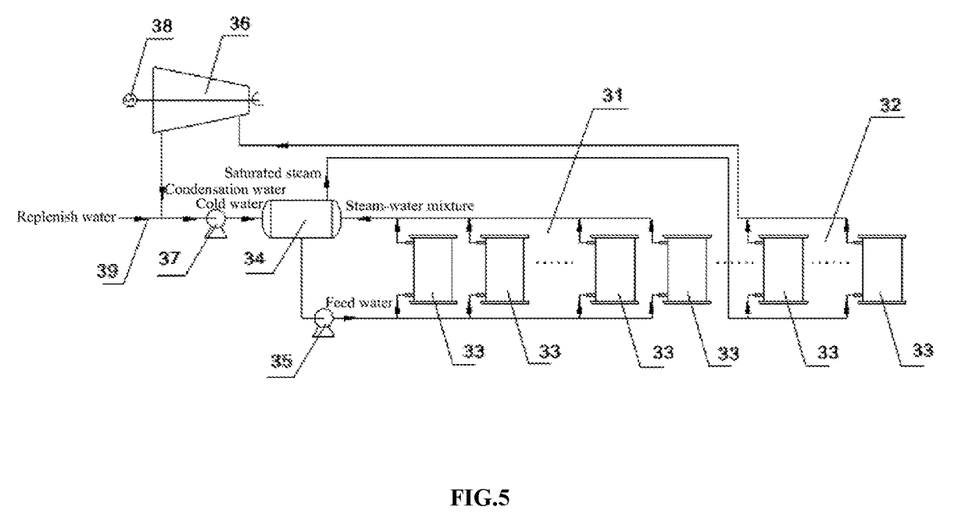
FIG. 5 is a schematic structural diagram of a coke oven ascension pipe waste heat boiler power generation device according to Embodiment 4.

A coke oven ascension pipe waste heat boiler power generation device is provided, as shown in FIG. 5. It includes a distributed ascension pipe raw coke oven gas evaporator set (31), a distributed ascension pipe raw coke oven gas superheater set (32), a steam drum (34), a circulation pump (35), a steam turbine (36), a water-feeding pump (37), and a power generation device (38). The distributed ascension pipe raw coke oven gas evaporator set (31) and the distributed ascension pipe raw coke oven gas superheater set (32) each separately include a group of devices (33) for recovering the waste heat of raw coke oven gas in the ascension pipe of the coke oven according to Embodiment 2 that are connected in parallel. The steam drum (34) is provided with a steam-water mixture inlet pipe, a saturated steam outlet pipe, a water inlet, and a water outlet. The distributed ascension pipe raw coke oven gas evaporator set (31) is connected to the steam-water mixture inlet of the steam drum (34). The saturated steam outlet pipe of the steam drum (34), the distributed ascension pipe raw coke oven gas superheater set (32), the steam turbine (36), the water-feeding pump (37), and the water inlet of the steam drum (34) are sequentially connected. The water outlet of the steam drum (34) is connected to the circulation pump (35). The circulation pump (35) is connected to the distributed ascension pipe raw coke oven gas evaporator set (31). The power generation device (38) is connected to the steam turbine (36). A water replenishment pipeline (39) is further included, and the water replenishment pipeline (39) is connected between the steam turbine (36) and the water-feeding pump (37).

Using the coke products with 1000,000 tons per year coking as an example, a temperature of raw coke oven gas inlet to the ascension pipe is about 750° C. Currently, it is reduced to 70° C. by spraying aqueous ammonia.

Renovation is performed thereto, and this coke oven ascension pipe waste heat boiler power generation device of a heat medium circulation type (including the straight fin 1) is used, to recover the raw coke oven gas waste heat. The steam is of 0.8 MPa pressure is superheated to 250° C. The steam products is up to 90,000-120,000 tons per year. Or the steam is of 3.82 MPa pressure can be superheated to 300° C., and the products can be up to 80,000-100,000 tons per year. The steam is connected to a power generation system, and annual power generation can reach 15 million kWh, bringing remarkable economic benefits.

In view of the foregoing ideal embodiments of the present invention and based on the foregoing descriptive content, various changes and modifications may be definitely made by a person skilled in the art without departing from the scope of the technical idea of the present invention. The technical scope of the present invention is not limited to the content in this specification, and the technical scope of the present invention should be determined according to the claims.

What is claimed is:

1. A straight fin for a device for recovering waste heat of raw coke oven gas in an ascension pipe of a coke oven, comprising: a straight fin body and a plurality of V-shaped notches disposed on the straight fin body; a depth of the plurality of V-shaped notches is less than a width of the straight fin body; and distances between the V-shaped notches adjacent to each other increase from bottom to top in a longitudinal direction of the straight fin body, wherein the plurality of V-shaped notches are sequentially numbered Q1 to Qn−1 from bottom to top in the longitudinal direction of the straight fin body; a distance from Q1 to a bottom of the straight fin body is L1, the distances between the V-shaped notches adjacent to each other from bottom to top are L2 to Ln−1, and a distance from Qn−1 to a top of the straight fin body is Ln; and values of L1 to Ln increase.

2. The straight fin for the device for recovering the waste heat of the raw coke oven gas in the ascension pipe of the coke oven according to claim 1, wherein L1 to Ln form an arithmetic sequence.

3. The straight fin for the device for recovering the waste heat of the raw coke oven gas in the ascension pipe of the coke oven according to claim 1, wherein each V-shaped notch has an equal opening angle, and each V-shaped notch has an equal depth.

4. A device for recovering waste heat of raw coke oven gas in an ascension pipe of a coke oven, comprising at least one straight fin according to claim 1.

5. The device for recovering the waste heat of the raw coke oven gas in the ascension pipe of the coke oven according to claim 4, comprising a raw coke oven gas pipe drum, a heat transfer tube, and a plurality of straight fins; the heat transfer tube is disposed tightly on an outer wall of the raw coke oven gas drum; the plurality of straight fins are disposed on an inner wall of the raw coke oven gas drum; a raw coke oven gas inlet is provided with a lower flange and a raw coke oven gas outlet is provided with an upper flange for the raw coke oven gas drum; an expansion joint is provided at an upper part of the raw coke oven gas pipe drum; and the heat transfer tube is provided with a heat transfer medium inlet at a lower part and a heat transfer medium outlet at an upper part.

6. The device for recovering the waste heat of the raw coke oven gas in the ascension pipe of the coke oven according to claim 5, wherein the plurality of straight fins are disposed at a same interval along a circumference of the inner wall of the raw coke oven gas drum; and the plurality of straight fins are vertically disposed along the inner wall of the raw coke oven gas drum.

7. A coke oven ascension pipe waste heat boiler power generation device, comprising the straight fin according to claim 1.

8. The coke oven ascension pipe waste heat boiler power generation device according to claim 7, comprising a waste heat boiler, a heat medium pump, a steam turbine, a water pump, a power generation device, and a plurality of devices for recovering the waste heat of the raw coke oven gas in the ascension pipe of the coke oven; the waste heat boiler comprises a heat medium pipeline and a steam-water circulation pipeline; a heat medium outlet of the device for recovering the waste heat of the raw coke oven gas in the ascension pipe of the coke oven is connected to the heat medium pipeline and the heat medium pump of the waste heat boiler sequentially, the heat medium pump is connected to the heat medium inlet of each device for recovering the waste heat of the raw coke oven gas in the ascension pipe of the coke oven; the steam-water circulation pipeline, the steam turbine, and the water pump of the waste heat boiler are sequentially connected as a ring; and the power generation device is connected to the steam turbine.

9. The coke oven ascension pipe waste heat boiler power generation device according to claim 7, comprising a distributed ascension pipe raw coke oven gas evaporator set, a distributed ascension pipe raw coke oven gas superheater set, a steam drum, a water circulation pump, a steam turbine, a water-feeding pump, and a power generation device; the distributed ascension pipe raw coke oven gas evaporator set and the distributed ascension pipe raw coke oven gas superheater set each separately comprise a plurality of devices for recovering the waste heat of the raw coke oven gas in the ascension pipe of the coke oven that are connected in parallel; the steam drum is provided with a steam-water mixture inlet pipe, a saturated steam outlet pipe, a water inlet, and a water outlet; the distributed ascension pipe raw coke oven gas evaporator set is connected to the steam-water mixture inlet of the steam drum; the saturated steam outlet pipe of the steam drum, the distributed ascension pipe raw coke oven gas superheater set, the steam turbine, the water-feeding pump, and the water inlet of the steam drum are sequentially connected; the water outlet of the steam drum is connected to the water circulation pump, and the water circulation pump is connected to the distributed ascension pipe raw coke oven gas evaporator set; and the power generation device is connected to the steam turbine.

10. The device for recovering the waste heat of the raw coke oven gas in the ascension pipe of the coke oven according to claim 4, wherein each V-shaped notch have an equal opening angle, and each V-shaped notch has an equal depth.

11. The device for recovering the waste heat of the raw coke oven gas in the ascension pipe of the coke oven according to claim 10, comprising a raw coke oven gas pipe drum, a heat transfer tube, and a plurality of straight fins; the heat transfer tube is disposed tightly on an outer wall of the raw coke oven gas drum; the plurality of straight fins are disposed on an inner wall of the raw coke oven gas drum; a raw coke oven gas inlet is provided with a lower flange and a raw coke oven gas outlet is provided with an upper flange for the raw coke oven gas drum; an expansion joint is provided at an upper part of the raw coke oven gas pipe drum; and the heat transfer tube is provided with a heat transfer medium inlet at a lower part and a heat transfer medium outlet at an upper part.

12. The device for recovering the waste heat of the raw coke oven gas in the ascension pipe of the coke oven according to claim 11, wherein the plurality of straight fins are disposed at a same interval along a circumference of the inner wall of the raw coke oven gas drum; and the plurality of straight fins are vertically disposed along the inner wall of the raw coke oven gas drum.

* * * * *

Disclaimer

10,760,001 B2 - Xiaoping Liu; Jianning Lu; Juxiang Li, Renhe Doug; Guilan Yang, Xuan Zheng, all of Najing (CN). STRAIGHT FIN FOR DEVICE FOR RECOVERING WASTE HEAT OF RAW COKE OVEN GAS IN ASCENSION PIPE OF COKE OVEN, AND HEAT RECOVERING DEVICE. Patent dated September 1, 2020. Disclaimer filed February 29, 2024, by the assignee, NANJING HUADIAN ENERGY-SAVING & ENVIRONMENTAL PROTECTION EQUIPMENT CO., LTD.

I hereby disclaim the terminal part of the term beginning on February 26, 2024 of said patent.

*(Official Gazette, May 14, 2024)*